United States Patent [19]

Ezawa et al.

[11] Patent Number: 4,524,269
[45] Date of Patent: Jun. 18, 1985

[54] CARD OPERATION INDICATOR FOR MAGNETIC CARD DRIVE DEVICES

[75] Inventors: Sadaaki Ezawa; Hiroshi Kitagawa, both of Shizuoka, Japan

[73] Assignee: Kabushiki Kaisha Kawai Gakki Seisakusho, Japan

[21] Appl. No.: 466,365

[22] Filed: Feb. 14, 1983

[30] Foreign Application Priority Data

Feb. 23, 1982 [JP] Japan .................................. 57-27838

[51] Int. Cl.³ .............................................. G06K 7/08
[52] U.S. Cl. .................................... 235/449; 235/482; 340/686
[58] Field of Search ....................... 235/449, 493, 482; 340/527, 686, 309.15; 360/2

[56] References Cited

U.S. PATENT DOCUMENTS

| | | | |
|---|---|---|---|
| 4,094,462 | 6/1978 | Moschner | 235/449 X |
| 4,206,926 | 6/1980 | Stave | 340/686 X |
| 4,322,613 | 3/1982 | Oldenkamp | 235/449 |

Primary Examiner—David L. Trafton
Attorney, Agent, or Firm—McGlew and Tuttle

[57] ABSTRACT

When a magnetic card having two recording zones is inserted into a magnetic card drive device for a read/write operation of each recording zone, a magnetic card generation indicator lights an indicator lamp after a predetermined period of time following a first insertion of the magnetic card, turns ON and OFF the lamp upon pulling out of the magnetic card from the magnetic card drive device, lights the indicator lamp again after a predetermined period of time following a second insertion of the magnetic card, and puts out the lamp upon pulling out of the magnetic card. By lighting, turning ON and OFF and putting out of the indicator lamp, it is possible to prevent mishandling of the magnetic card having two recording zones to ensure the read/write operation of the both recording zones and timely pulling out of the magnetic card from the magnetic card drive device.

3 Claims, 10 Drawing Figures

CARD OPERATION INDICATOR FOR MAGNETIC CARD DRIVE DEVICES

BACKGROUND OF THE INVENTION

1. Field of the Invention

The present invention relates to a card operation indicator for magnetic card drive devices which is intended to prevent mishandling of a magnetic card having two recording zones.

2. Description of the Prior Art

Conventional magnetic cards are mostly of the type having a recording zone on one side thereof as shown in FIG. 1 and, consequently, magnetic card drive devices for use with them are also provided with a read/write head on one side only. Only with such a one-sided recording zone, however, the recording capacity of the magnetic card may sometimes be insufficient, and use is made of a magnetic card having two recording zones as shown in FIG. 2. In the case of using such a magnetic card having two recording zones, it is necessary that a read/write operation for the one recording zone be followed by re-insertion of the magnetic card with the front side back for the read/write operation of the other recording zone; otherwise, a special magnetic card drive device must be prepared which is provided with read/write heads on both sides thereof. But such a special magnetic card drive device calls for twice as many read/write heads and head signal processing circuits as those used in the conventional magnetic card drive device, and hence it is more expensive. On the other hand, when the magnetic card having two recording zones is used with the conventional magnetic card drive device having one read/write head, it often happens that the user, once having pulled out the magnetic card after the read/write operation for the one recording zone, forgets to insert it again for the read/write operation of the other recording zone.

Furthermore, in the case where the magnetic card drive device is of the type that the magnetic card is manually handled, a read or write error is apt to occur if the magnetic card is pulled out of the magnetic card drive device immediately after being inserted thereinto. With the magnetic card drive device, it is usually determined that the magnetic card be held still in position for 200 ms or longer after insertion. A short-tempered person, however, when handling the magnetic card, tends to pull it out within about 100 ms.

SUMMARY OF THE INVENTION

It is therefore an object of the present invention to provide a card generation indicator for a magentic card drive device which gives a warning to the user against forgetting to reinsert a magnetic card for the read/write operation of the remaining one of two recording zones after the read/write operation of the other recording zone and against too early takeout of the magnetic card from the magnetic card drive device.

Briefly stated, the card generation indicator of the present invention for a magnetic card drive device of the type having a read/write head for reading out data from or writing data in one of two recording zones of a magnetic card, includes detecting means for detecting whether the insertion of the magnetic card into the magnetic card drive device is a first-time or second-time insertion, delay means for providing a predetermined delay time after the insertion of the magnetic card, one indicator lamp and control means for lighting, putting out and turning ON and OFF the indicator lamp by the outputs of the detecting means and the delay means.

According to the present invention, the timing for handling the magnetic card is indicated by lighting, putting out and turning ON and OFF the indicator lamp; it is therefore possible to prevent mishandling of the magnetic card, ensuring read/write operations of the both recording zones of the magnetic card and timely takeout of the magnetic card from the card drive device.

DESCRIPTION OF THE PREFERRED EMBODIMENTS

Figure 1:
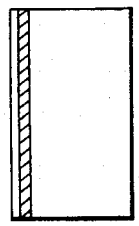
FIG. 1 is a diagram explanatory of a conventional magnetic card.
Figure 2:
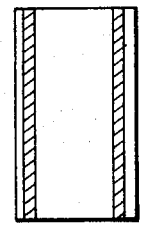
FIG. 2 is a diagram explanatory of a magnetic card for use with the present invention.
Figure 3:
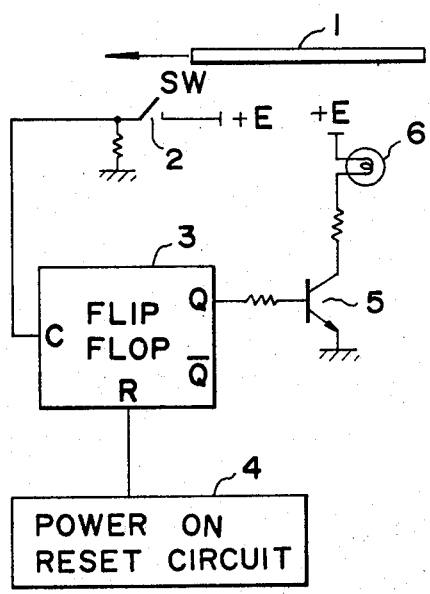
FIGS. 3, 4 and 5 are circuit diagrams illustrating the arrangements of embodiments of the present invention.

FIG. 3 illustrates the arrangement of an embodiment of the present invention. In FIG. 3 a switch (SW)2 is a microswitch which is turned ON upon insertion of a magnetic card 1 into a magnetic card drive device. At first, a flip-flop (FF)3 is reset by a power ON reset circuit 4, by which its output Q goes to a "0" to keep a transistor 5 in the OFF state, retaining an indicator lamp 6 in the OFF state. Upon insertion of the magnetic card 1, the switch (SW)2 is turned ON to raise the potential at a clock terminal C of the flip-flop (FF)3 from the "0" level to the "1" level, by which the flip-flop (FF)3 toggles to make its output Q a "1".

In consequence, the transistor 5 is turned ON, lighting the indicator lamp 6. Even after the switch (SW)2 is turned OFF by pulling out of the magnetic card 1 from the magnetic card drive device, the flip-flop (FF)3 does not toggle by the fall of the potential at its clock terminal C, so that the transistor 5 remains in the ON state, holding the indicator lamp 6 lighting until the magnetic card 1 is inserted again with the front side back.

Upon reinsertion of the magnetic card 1, the switch (SW)2 is turned ON again and the flip-flop (FF)3 toggles to make its output Q a "0", putting out the indicator lamp 6.

Figure 4:
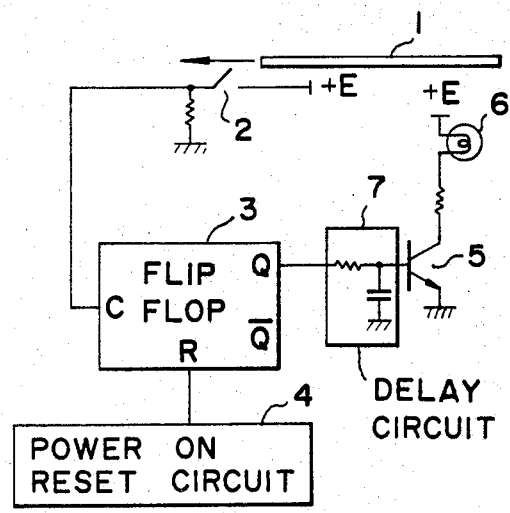

FIG. 4 illustrates the arrangement of another embodiment of the present invention, in which a delay circuit 7 is connected to the base of the transistor 5. When the magnetic card 1 is inserted, the timing for light the indicator lamp 6 is delayed by the delay circuit 7. This delay time is preset longer than the aforementioned period of time for which the magnetic card 1 has to be held in stillness. Accordingly, lighting of the indicator lamp 6 indicates the timing for pulling out the magnetic card 1. Similarly, the timing for putting out the indicator lamp 6 by the next insertion of the magnetic card 1 is also delayed and this delay time is likewise preset longer than the aforesaid period of time for holding the magnetic card 1 in stillness. Accordingly, putting out of the indicator lamp 6 indicates the timing for pulling out of the magnetic card 1 inserted for the second time.

Figure 5:
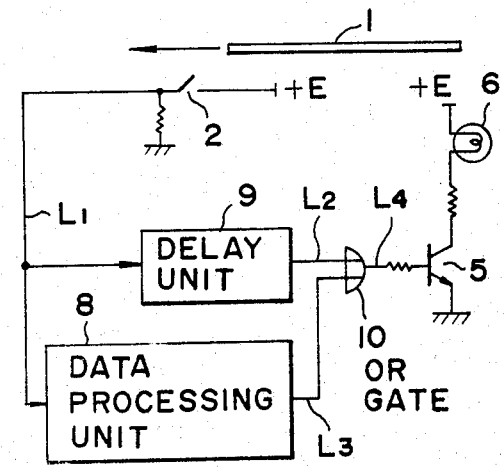
Figure 6:
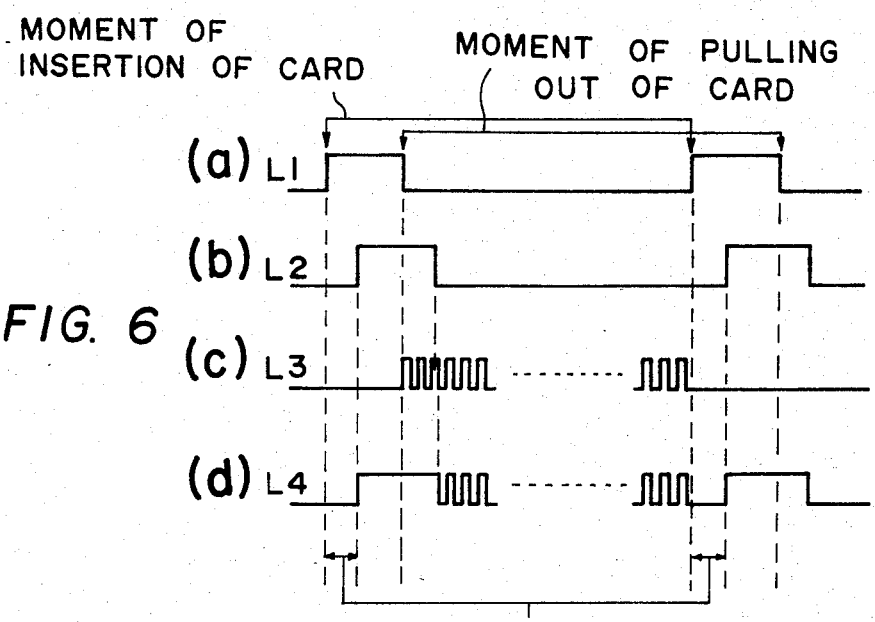
FIG. 6 is a timing circuit chart of separate wave forms a, b, c, and d which are interconnected.
Figure 7:
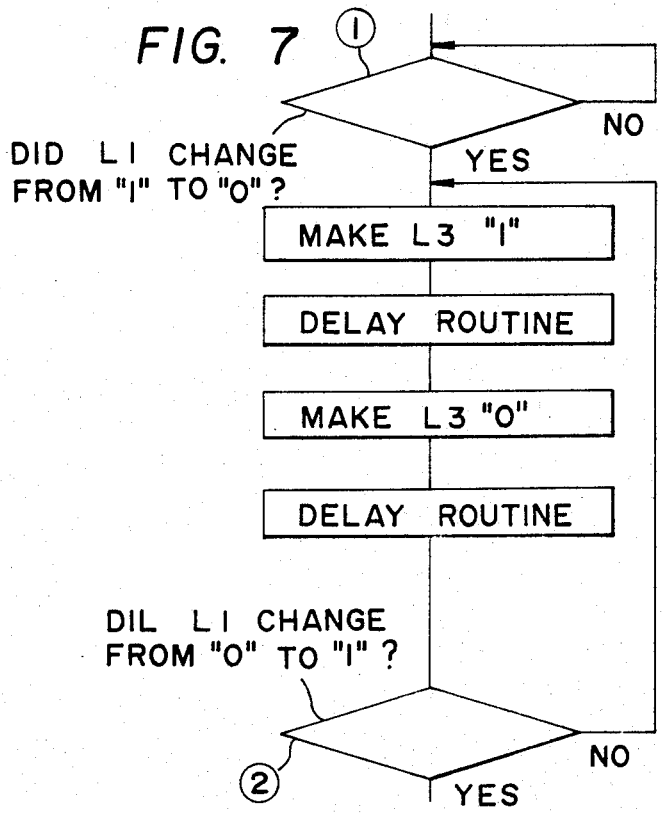
FIG. 7 is a flow chart explanatory of the embodiment of FIG. 5.

FIG. 5 illustrates the arrangement of still another embodiment of the present invention and FIG. 6 wave-forms (a) to (d) show a timing chart explanatory of its operation. In FIG. 5, when the switch (SW)2 is turned ON by the insertion of the magnetic card 1, an insertion signal L1 is branched into two, one of which is processed by a data processing unit 8 to obtain a signal L3 and the other of which is delayed by a delay unit 9 to obtain a signal L2. The signals L2 and L3 are applied via an OR gate 10 to the base of the transistor 5 to control it. The data processing unit 8 is formed, for example, by a microcomputer. FIG. 7 is a flowchart explanatory of its operation. Upon detecting that the insertion signal L1 in FIG. 6 waveform (a) changes from the "1" level to the "0" level, the data processing unit 8 starts to send out an ON-OFF signal L3 shown in FIG. 6 waveform (c). Next, when detecting a change of the insertion signal L1 from the "0" level to the "1" level, the data processing unit 8 stops sending out of the ON-OFF signal L3. The transistor 5 is controlled by a signal L4 of FIG. 6 waveform (d) which is produced by applying to the OR gate 10 the signal L3 and the signal L2 of FIG. 6 waveform (b) obtained by delaying the insertion signal L1 in the delay unit 9. With such an arrangement, the timing for pulling out the magnetic card 1 inserted for the first and the second time is indicated by lighting of the indicator lamp 6. After the first read/write operation of the one recording zone the indicator lamp 6 goes on and off, issuing a warning to the user against a failure of the second read/write operation for the other remaining recording zone.

Needless to say, the data processing unit 8 can also be employed for card read/write processing. This can be achieved, for example, by providing a first processing routine immediately after a step 1 and a second processing routine after a step 2 in FIG. 7. In this case, the ON-OFF signal L3 is yielded after the first processing routine. The same results as described above can be obtained by using a sound producing element in place of the indicator lamp 6.

As has been described in the foregoing, according to the present invention, the timing for handling a magnetic card having two recording zones is indicated by lighting, putting out and turning ON and Off the indicator lamp; therefore, it is possible to prevent mishandling of the magnetic card, ensuring read/write operations of the both recording zones of the magnetic card and timely takeout of the magnetic card from the magnetic card drive device.

It will be apparent that many modifications and variations may be effected without departing from the scope of the novel concepts of the present invention.

What is claimed is:

1. A magnetic card generation indicator for a magnetic card drive device which is provided with a head for reading data from or writing data in one of two recording zones of a magnetic card, comprising:
   detecting means for detecting whether the insertion of the magnetic card into the magnetic card drive device is a first or second insertion;
   delay means for providing a predetermined delay time after the insertion of the magnetic card;
   an indicator lamp; and
   control means for controlling the indicator lamp by the outputs of the detecting means and the delay means to light, put out and turn ON and OFF the indicator lamp.

2. A magnetic card generation indicator according to claim 1 wherein the control means delays lighting of the indicator lamp at the time of the first insertion of the magnetic card and delays putting out of the indicator lamp at the time of the second insertion of the magnetic card.

3. A magnetic card generation indicator according to claim 1 wherein the control means lights the indicator lamp after a predetermined period of time following the first insertion of the magnetic card, turns ON and OFF the indicator lamp upon pulling out of the magnetic card from the magnetic card drive device, lights the indicator lamp after a predetermined period of time following the second insertion of the magnetic card and puts out the indicator lamp upon pulling out of the magnetic card.

* * * * *